US010224838B2

(12) United States Patent
Wiszniewski et al.

(10) Patent No.: US 10,224,838 B2
(45) Date of Patent: Mar. 5, 2019

(54) METHOD AND DEVICE FOR ELECTRODYNAMIC BRAKING OF A UNIVERSAL MOTOR

(71) Applicant: Robert Bosch GmbH, Stuttgart (DE)

(72) Inventors: Jacek Wiszniewski, Leinfelden-Echterdingen (DE); Kamil Pogorzelski, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 24 days.

(21) Appl. No.: 14/390,086

(22) PCT Filed: Mar. 5, 2013

(86) PCT No.: PCT/EP2013/054423

§ 371 (c)(1),
(2) Date: Oct. 2, 2014

(87) PCT Pub. No.: WO2013/149780

PCT Pub. Date: Oct. 10, 2013

(65) Prior Publication Data

US 2015/0108926 A1 Apr. 23, 2015

(30) Foreign Application Priority Data

Apr. 5, 2012 (DE) ........................ 10 2012 205 728

(51) Int. Cl.
*H02P 3/06* (2006.01)
*H02P 3/18* (2006.01)
(Continued)

(52) U.S. Cl.
CPC .................. *H02P 3/06* (2013.01); *H02P 3/18* (2013.01); *H02P 25/14* (2013.01); *H02P 6/08* (2013.01); *H02P 6/14* (2013.01); *H02P 21/06* (2013.01)

(58) Field of Classification Search
CPC .................................... H02P 3/12; H02P 3/22
See application file for complete search history.

(56) References Cited

U.S. PATENT DOCUMENTS 4,039,914 A * 8/1977 Steigerwald ............ H02P 23/08 318/375
5,811,945 A * 9/1998 Hellinger ................ B66C 13/30 212/272

(Continued)

FOREIGN PATENT DOCUMENTS

CN 101102090 A 1/2008
CN 101170294 A 4/2008

(Continued)

OTHER PUBLICATIONS

International Search Report corresponding to PCT Application No. PCT/EP2013/054423, dated Nov. 22, 2013 (German and English language document) (5 pages).

*Primary Examiner* — Bickey Dhakal
*Assistant Examiner* — Charles S Laughlin
(74) *Attorney, Agent, or Firm* — Maginot, Moore & Beck LLP

(57) ABSTRACT

A method and device for electrodynamic braking of a universal motor. The method comprises the steps of continuously ascertaining a rotational speed of the universal motor, temporarily, periodically short-circuiting an armature of the universal motor with a semiconductor switch, and regulating firing angles of the semiconductor switch with a regulating device. The regulating device regulates firing angles of the semiconductor switch such that the rotational speed of the universal motor is adapted with minimal deviation to a rotational speed of a target rotational speed profile.

5 Claims, 3 Drawing Sheets b
3'
U
33
36
2
35
5
S
f
e
4
1'
3
31
32
34
30
a
6
1

(51) Int. Cl.

| | |
|---|---|
| ***H02P 25/14*** | (2006.01) |
| *H02P 6/08* | (2016.01) |
| *H02P 6/14* | (2016.01) |
| *H02P 21/06* | (2016.01) |

(56) References Cited

U.S. PATENT DOCUMENTS

| | | | | |
|---|---|---|---|---|
| 7,646,155 | B2 * | 1/2010 | Woods | H02P 25/14 318/255 |
| 2004/0207351 | A1 * | 10/2004 | Hahn | H02P 3/12 318/379 |
| 2005/0052145 | A1 * | 3/2005 | Carrier | H02P 3/12 318/381 |
| 2008/0284361 | A1 * | 11/2008 | Walter | H02P 25/14 318/245 |
| 2010/0079098 | A1 * | 4/2010 | Woods | H02P 25/14 318/494 |
| 2010/0194320 | A1 * | 8/2010 | Kaneko | H02P 21/06 318/400.23 |
| 2011/0254480 | A1 * | 10/2011 | Chen | H02P 6/085 318/400.13 |
| 2011/0316456 | A1 * | 12/2011 | Rottmerhusen | H02P 3/22 318/381 |

FOREIGN PATENT DOCUMENTS

| | | | |
|---|---|---|---|
| CN | 101809857 | A | 8/2010 |
| WO | 2011/076827 | A2 | 6/2011 |

* cited by examiner

METHOD AND DEVICE FOR ELECTRODYNAMIC BRAKING OF A UNIVERSAL MOTOR

This application is a 35 U.S.C. § 371 National Stage Application of PCT/EP2013/054423, filed on Mar. 5, 2013, which claims the benefit of priority to Serial No. DE 10 2012 205 728.5, filed on Apr. 5, 2012 in Germany, the disclosures of which are incorporated herein by reference in their entirety.

The present disclosure relates to a method and a device for electrodynamic braking of a universal motor.

BACKGROUND

A method for electrodynamic braking of a universal motor is known, for example, from WO 2011/076827. The method disclosed there disadvantageously does not adapt to changes of the rotational speed of the universal motor due to external influences, for example, wear, aging, different tools, or tolerances. This may result in different braking times and/or increased loading of the collector of the universal motor.

SUMMARY

One object of the present disclosure is therefore to provide an improved method for electrodynamic braking of a universal motor.

This object is achieved according to a first aspect by a method for electrodynamic braking of a universal motor, having the following steps during a braking operation:

- continuously ascertaining a rotational speed of the universal motor;
- temporarily, periodically short-circuiting an armature of the universal motor by means of a semiconductor switch, wherein firing angles of the semiconductor switch are regulated in such a way that the rotational speed is adapted with minimal deviation to a rotational speed of a target rotational speed profile by means of a regulating device.

One advantage of the method according to the present disclosure is that by adapting the firing angle to the respective current rotational speed, braking operations of the universal motor may be designed substantially more uniformly. In addition, loading of the armature caused by undesirable induction currents may be reduced significantly, which may advantageously increase the operating life of the universal motor. As a result, individual operating conditions of the universal motor may advantageously be taken into account during the braking operation.

One preferred specific embodiment of the method provides that, depending on the deviation, a defined firing angle is added to or subtracted from the set firing angle. As a result, a regulation reserve may advantageously be defined, by means of which an overshooting or undershooting of the target rotational speed may be correspondingly taken into account during the electrodynamic braking operation.

One preferred refinement of the method provides that the target rotational speed profile takes into account a maximum loading of the universal motor. In this way, lower loadings of the universal motor than the maximum loading are able to be handled on safely. A safety level for the universal motor is thus advantageously increased.

One preferred refinement of the method provides that the maximum loading has a maximum target rotational speed and a maximum moment of inertia for the universal motor. As a result, a loading scenario of the universal motor may be designed to the greatest possible extent in terms of a worst-case scenario.

One refinement of the method according to the present disclosure provides that, in the case that the deviation exceeds a defined size, firing angles of the semiconductor switch are set according to an indexed mapping of firing angles to target rotational speeds of the universal motor, wherein a firing angle in the mapping is accessed across indices. As a result, even large, generally externally induced rotational speed changes of the universal motor during the braking operation may be taken into account via correspondingly large changes of the firing angle of the semiconductor switch.

Refinements of the method provide that the mapping is designed as a table or a straight-line approximation. As a result, the mapping may be advantageously implemented in various technical ways.

According to another aspect, the object is achieved using a device for electrodynamic braking of a universal motor, having:

- a rotational speed sensor for continuously ascertaining a rotational speed of the universal motor;
- a semiconductor switch with which an armature of the universal motor is temporarily, periodically short-circuited for braking the universal motor, wherein firing angles of the semiconductor switch are regulated in such a way that the rotational speed is adapted with minimal deviation to a rotational speed of a target rotational speed profile by means of a regulating device situated in a control device.

The present disclosure is described in greater detail below having additional features and advantages, based on multiple figures. In this context, all described or illustrated features, individually or in any combination, constitute the subject matter of the present disclosure, regardless of their recapitulation in the patent claims or their back-reference, and regardless of their wording and representation in the description and in the figures. The figures are primarily intended to illustrate the principles relevant to the present disclosure.

DETAILED DESCRIPTION

Figure 1:
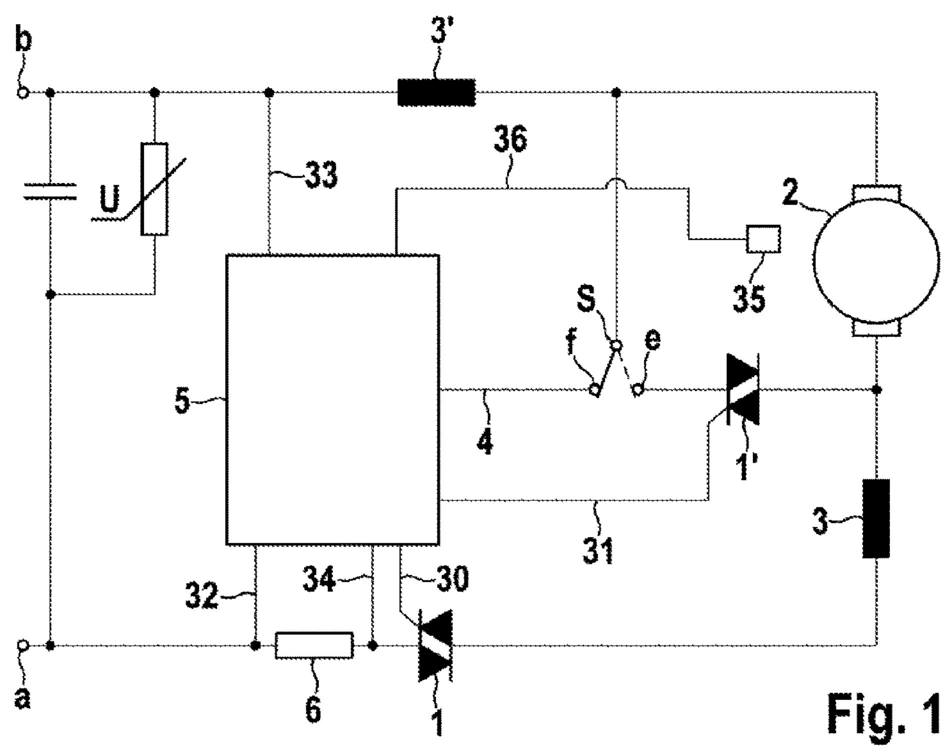
FIG. 1 shows a circuit diagram of an electrodynamic braking device for a universal motor with which the method according to the present disclosure may be carried out.

FIG. 1 shows a circuit diagram of an electrodynamic braking device for an electric universal motor with which the method according to the present disclosure may be carried out. The device essentially corresponds to a system disclosed in WO 2011/076827, which is also described in detail there. An electronic control device 5 may, for example, be designed as a microcontroller circuit. A regulating device is preferably designed through software within the electronic control device 5. An adaptation of the firing angle of the semiconductor switch 1' through regulation may be carried out by means of the electronic control device 5, the method of operation of this adaptation being described in greater detail with reference to FIG. 3.

Furthermore, the electrodynamic braking device has an indexed mapping (not shown) inside the electronic control device 5. The mapping is preferably implemented through software or hardware and includes a target rotational speed profile having combinations of firing angles φ of the second electronic semiconductor switch 1' with rotational speeds of the universal motor corresponding to the firing angles φ from a previously ascertained ideal braking operation of the universal motor. The aforementioned indexed mapping may, for example, be designed as a table or as a straight-line approximation of at least two straight lines. It goes without saying that the aforementioned mapping may be designed in any known manner.

A rotational speed sensor 35 is provided for a continuous ascertainment of the rotational speed n of the universal motor during the braking operation. Reference will not be made below to additional circuit and function details of the system shown in FIG. 1, as they are already known from WO 2011/076827.

Figure 2:
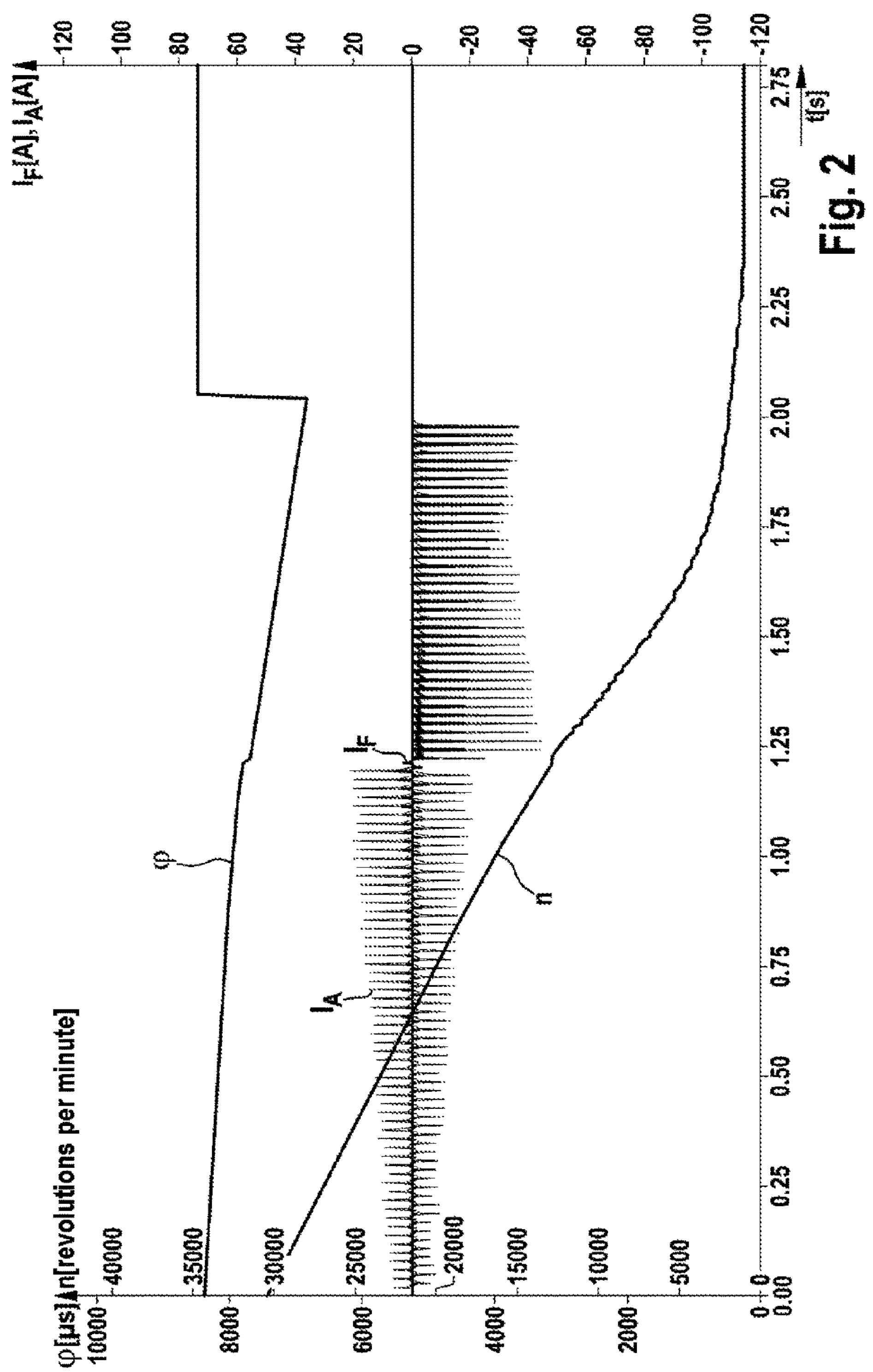
FIG. 2 shows a schematic time profile of characteristic values of a universal motor during a conventional electrodynamic braking operation.

FIG. 2 shows a schematic time diagram having characteristic values of a universal motor during a conventional electrodynamic braking operation which, for example, may be carried out using the electrodynamic braking device from FIG. 1. During the braking operation of the universal motor, the first semiconductor switch 1 is fired in a phase-angle control in each half cycle of the power grid voltage, and the second semiconductor switch 1' is fired after a brief delay. In a phase-angle operation, a firing angle φ of the second semiconductor switch 1' is set at the second semiconductor switch 1' according to a predefined firing angle profile stored in the mapping. The condition for each firing of the second semiconductor switch 1' is in each case that the first semiconductor switch 1 was previously fired or switched through.

In FIG. 2, it is apparent that a rotational speed n of the universal motor drops from approximately 30,000 revolutions per minute to approximately 1,000 revolutions per minute during the electrodynamic braking operation. A time profile of the armature current $I_A$ and a profile of the field current $I_F$ represent power drains of the universal motor during the braking operation, wherein a braking effect on the universal motor essentially comes from the armature current $I_A$. At approximately 1.15 s, a so-called "half-cycle operation" begins due to the already steep drop in rotational speed, in which the second semiconductor switch 1' is fired only in every second half cycle of the power grid voltage.

A great disadvantage of the conventional braking operation of the universal motor depicted in FIG. 2 is that the firing angle φ of the second semiconductor switch 1' is always set in an unchangeable manner according to the predefined ideal firing angle profile. Therefore, no individual operating conditions of the universal motor, such as changing viscosities of lubricants used, production tolerances, loading due to different tools, temperatures, etc., all of which may affect the operating behavior of the universal motor, may be taken into account by means of the fixed firing angle profile. Differing braking times and, under certain circumstances, increased brush sparking and thus increased wear of the commutator of the universal motor may disadvantageously result from the fixed braking profile, as a result of which an operational lifetime of the universal motor may be considerably shortened.

According to the present disclosure, to eliminate the aforementioned disadvantages, it is provided that during the braking operation of the universal motor, a rotational speed n is continuously ascertained by means of the rotational speed sensor 35 and is compared to the target rotational speed profile which is stored in the mapping.

In the event that a deviation of the ascertained rotational speed n from the target rotational speed expected at the respective point in time is detected during the aforementioned comparison of the rotational speeds, it is provided according to the present disclosure to use the regulating device to readjust the firing angle φ of the second semiconductor switch 1'. The aforementioned regulating device has a certain limited, dimensionable regulation reserve. In the event of a deviation from the ideal rotational speed, a firing angle corresponding to the rotational speed difference is either added to or subtracted from the currently set firing angle. In this way, the firing angle φ of the second electronic semiconductor switch 1' is always optimally adapted to the actual rotational speed n. According to the present disclosure, it is thus sought, by means of the regulating device, to set the firing angle φ for the second semiconductor switch 1' which is characterized in that it generates a rotational speed of the universal motor which deviates as little as possible from the ideal target rotational speed.

In defining the ideal braking profile, a balance is sought to the effect that on the one hand, the braking time is kept as short as possible, but on the other hand, the current across the armature 2 is also kept as low as possible in order to minimize wear. In the case that the rotational speed ascertained during the braking operation of the universal motor essentially corresponds to the target rotational speed, a sequential processing of the firing angle φ within the mapping Z is carried out as in the manner already known.

Figure 3:
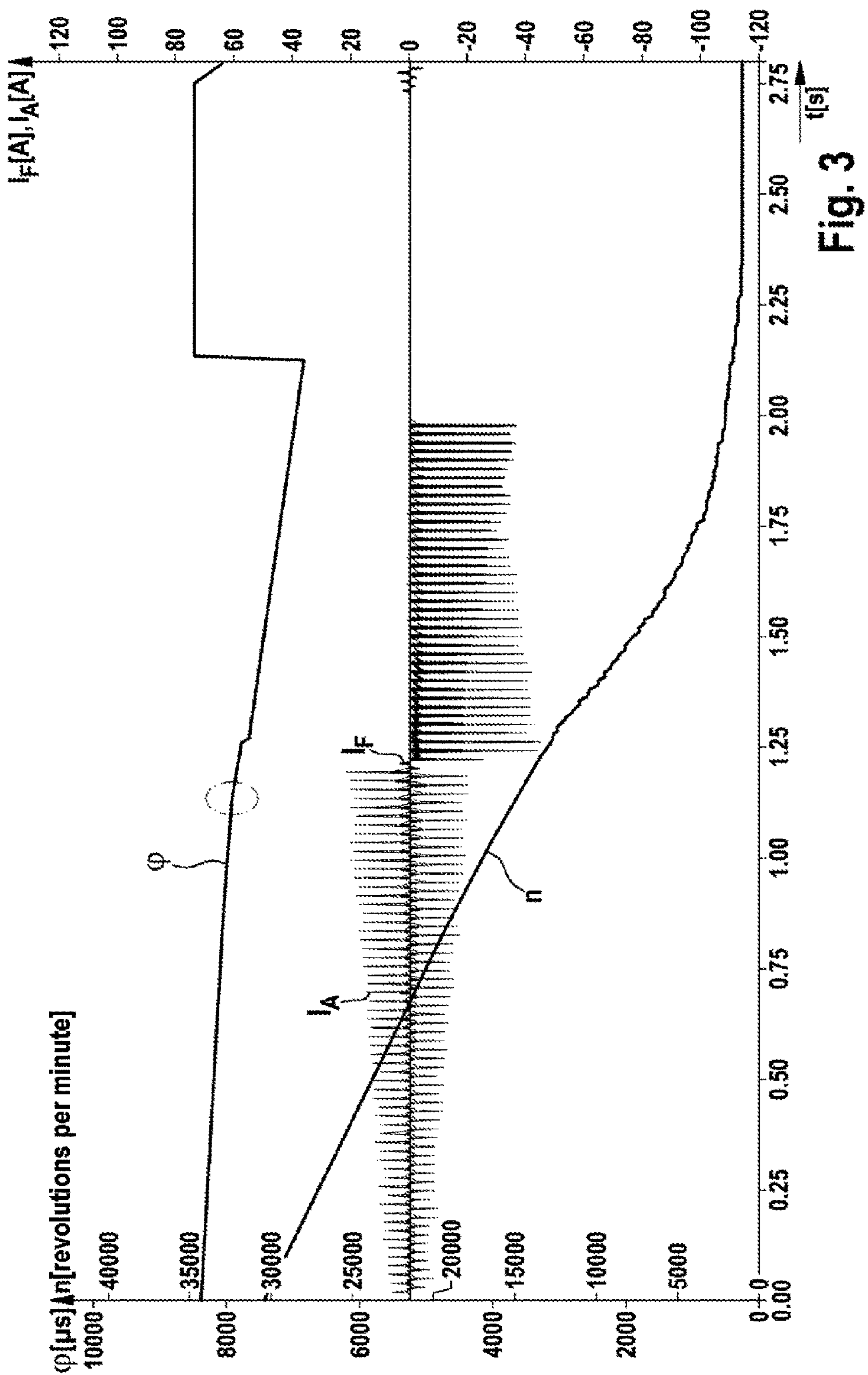
FIG. 3 shows a schematic time profile of characteristic values of a universal motor during an electrodynamic braking operation according to the present disclosure.

A profile according to the present disclosure of the characteristic values firing angle, rotational speed, armature current, and field current is schematically depicted in FIG. 3. In the time profile of FIG. 3, the aforementioned, for example, externally induced low reduction of the rotational speed n is apparent at approximately 1.1 s of the braking operation (highlighted by means of a graphical marking). The aforementioned drop in rotational speed may, for example, be caused by an external application of force to the universal motor, for example, by a tool driven by the universal motor.

In response to this, the firing angle is readjusted or corrected by means of the regulating device in such a way that the resulting rotational speed of the universal motor optimally approximates or corresponds to the stored ideal rotational speed. The current rotational speed n is ascertained in each half cycle of the power grid voltage by means of the rotational speed sensor 35 and compared to the ideal target rotational speed stored in the mapping Z during the braking operation.

In comparison to the setting of the firing angles φ of the time profile of FIG. 2, the firing angle φ thus changes its time profile according to the present disclosure in order thereby to be adapted to the current rotational speed n of the universal motor in a flexible manner. As a result, it is advantageously possible to homogenize the braking operation and to reduce the current flow due to electromagnetic induction processes within the armature. With lighter tools, this may advantageously significantly reduce a disadvantageous effect on the collector.

By means of the present disclosure, it is correspondingly thus advantageously possible to take into account slightly different mechanical resistances of different electric tools. Slight rotational speed changes and/or production tolerances and/or tool aging are advantageously taken into account by means of the present disclosure. In this way, a fine adjustment of the firing angle φ is advantageously possible in a simple manner.

The aforementioned target rotational speed profile preferably takes into account a maximum loading of the universal motor in a worst-case scenario. For this purpose, in a determination process of the mapping, for example, the universal motor is equipped with a heavy tool, for example, a circular saw having a maximum diameter or a hammer having a chisel which is as large as possible, and brought to a maximum rotational speed. An ideal braking operation of the universal motor is then ascertained, wherein the braking operation should preferably not be influenced by external influences. The value combinations for the firing angles φ and the target rotational speeds thus ascertained are stored in a suitable form in the mapping.

The regulating device and the mapping are preferably designed inside the control device 5 through software as a computer program. It is also possible to implement the regulating device and the mapping alternatively in known ways. In this way, only a low expenditure of additional computer power or of semiconductor memory results for the method according to the present disclosure. Advantageously, no additional hardware expenditure is required for the method according to the present disclosure.

In the event of large reductions in rotational speed, it may be required under some circumstances to carry out jumps across multiple indices within the indexed mapping in order to access the suitable firing angle φ for firing the second semiconductor switch 1'.

In summary, the present disclosure proposes an improved electrodynamic method for braking a universal motor, in which a firing angle profile of a semiconductor switch is readjusted and set during the braking operation according to the actual, current rotational speed. In principle, it is advantageously also possible that the method according to the present disclosure is applicable to rotational speed increases during the braking operation.

Although the present disclosure has been described based on a universal motor, it goes without saying that the present disclosure may be used for any types of common electric motors having armatures/rotors, which have a rotational speed detection and an electronic brake.

Furthermore, it goes without saying that the schematic system depicted in FIG. 1 for carrying out the method according to the present disclosure is only exemplary. Instead of the triacs which are depicted, thyristors, MOSFETs, IGBTs, or other power semiconductor switches may also be used in a suitable number in each case as first and second electronic semiconductor switches 1, 1'.

Those skilled in the art will thus modify the features of the present disclosure in a suitable manner and/or combine them without deviating from the core of the present disclosure.

The invention claimed is:

1. A method for electrodynamic braking of a universal motor, comprising:

continuously ascertaining a rotational speed of the universal motor;

identifying a deviation between the rotational speed of the universal motor and a predetermined target speed of the universal motor;

generating a phase angle adjustment for operation of a semiconductor switch with a regulating device according to an indexed mapping of phase angles to a target rotational speed profile of the universal motor stored in a memory, wherein the generating of the phase angle adjustment includes jumping across multiple indices within the indexed mapping to determine the phase angle adjustment when the deviation exceeds a defined amount, and wherein the target rotational speed profile is based at least in part on a maximum loading of the universal motor; and operating the semiconductor switch to generate periodic short-circuits in an armature of the universal motor at an adjusted phase angle corresponding to the phase angle adjustment being added to or subtracted from a predetermined phase angle for the universal motor to reduce the deviation between the rotational speed of the universal motor and the target speed.

2. The method as claimed in claim 1, wherein the maximum loading has a maximum target rotational speed and a maximum moment of inertia for the universal motor.

3. The method as claimed in claim 1, wherein the indexed mapping is configured as a table.

4. The method as claimed in claim 1, wherein the indexed mapping is configured as a straight-line approximation.

5. A device for electrodynamic braking of a universal motor, comprising:

a rotational speed sensor configured to continuously ascertain a rotational speed of the universal motor;

a semiconductor switch configured to temporarily, periodically short-circuit an armature of the universal motor to brake the universal motor; and a regulating device configured to:

identify a deviation between the rotational speed of the universal motor and a predetermined target speed of the universal motor;

generate a phase angle adjustment for operation of the semiconductor switch with the regulating device according to an indexed mapping of phase angles to a target rotational speed profile of the universal motor, wherein the generation includes jumping across multiple indices within the indexed mapping to determine the phase angle adjustment when the deviation exceeds a defined amount, and wherein the target rotational speed profile is based at least in part on a maximum loading of the universal motor; and operate the semiconductor switch to generate periodic short-circuits in the armature of the universal motor an adjusted phase angle corresponding to the phase angle adjustment being added to or subtracted from a predetermined phase angle for the universal motor to reduce the deviation between the rotational speed of the universal motor and the target speed.

* * * * *